Feb. 1, 1927.
E. B. STIMPSON
1,616,286
BOLT AND NUT ASSEMBLY
Filed Dec. 26, 1924
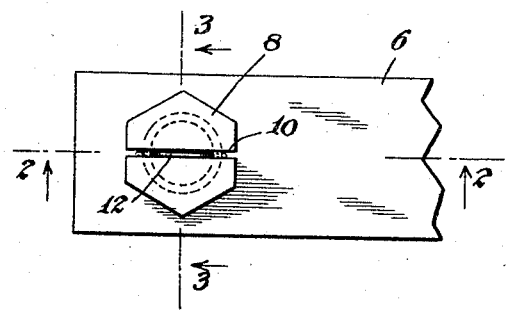
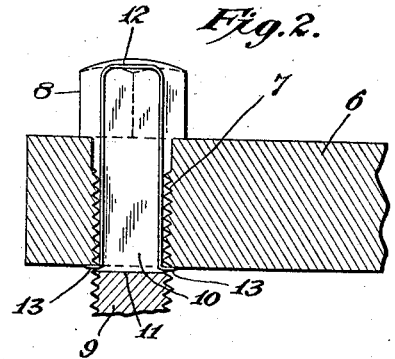
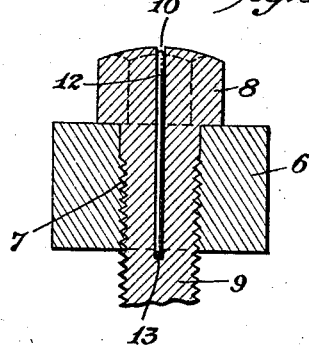
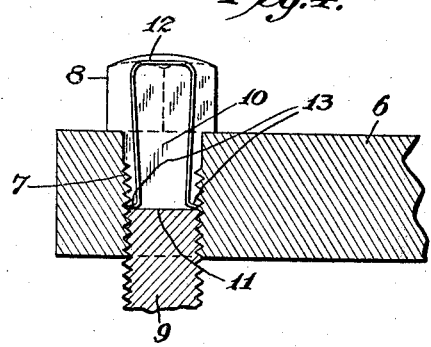
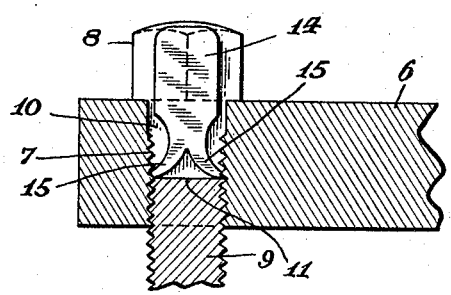
INVENTOR
Edwin B. Stimpson
BY
Frank J. Hent
ATTORNEY Patented Feb. 1, 1927.

1,616,286

UNITED STATES PATENT OFFICE.

EDWIN B. STIMPSON, OF BROOKLYN, NEW YORK, ASSIGNOR TO EDWIN B. STIMPSON COMPANY, OF BROOKLYN, NEW YORK.

BOLT AND NUT ASSEMBLY.

Application filed December 26, 1924. Serial No. 758,031.

This invention relates to a nut and bolt assembly and aims to restrain unintended relative rotation which might occur between the members of such an assembly due to vibration or other adventitious causes.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown merely a preferred form of embodiment of invention, Figure 1 is a plan view of an interiorly threaded member, which will hereinafter be referred to as the nut, with a bolt in position therein and embodying my invention;

Figure 2 is a sectional view taken on the line 2—2 of Figure 1 looking in the direction of the arrows;

Figure 3 is a sectional view taken on the line 3—3 of Figure 1, looking in the direction of the arrows;

Figure 4 is a view similar to Figure 2 illustrating another way of applying the principle of the invention; and Figure 5 is a view similar to Figure 4, showing a modified form of connecting member.

Referring to the numerals on the drawings there is shown at 6 an example of a member to which a bolt is to be connected. This member 6 may be an ordinary nut interiorly threaded, or it may be a part of some piece of apparatus, as for instance, a machine. In any case, it will carry a threaded bolt hole 7, which may extend all the way through the nut or member 6, as shown in the drawings, or may be merely a threaded socket tapped into the member 6. The numeral 8 indicates the head of a bolt, whose shank 9 is threaded to correspond with the threads of the bolt hole 7. 10 indicates a kerf or slot extending from the outside of the the bolt head and part way down into the shank. In the drawings this kerf is substantially diametrical of the bolt and of course it should not be carried so far down the shank as to fatally weaken the bolt. In this kerf 10 is received a connector, which may take various forms, and which in Figures 1, 2, 3 and 4 is shown as a length of suitable wire 12 bent into general U-shape, with the ends of the arms of the U bent outward as at 13. The bolt being in position, the connector 12 is inserted in the kerf, bent ends 13 first, the arms of the U being held compressed towards each other so as permit of the ends 13 passing the threads 7 of the nut. In the form shown in Figures 1, 2 and 3, the parts have been so relatively proportioned that with the bolt in position the bottom 11 of the kerf is slightly below the under surface of the nut 6, so that if the arms of the connector are allowed to spring apart they will take a position as shown in Figure 2, engaging under the bottom of the nut. Obviously, vibration will be ineffective to cause relative rotation of the bolt and nut, so long as the connector is in place. But if it is desired to remove the bolt, this may be readily accomplished after the connector is withdrawn, which is down by compressing the arms of the U towards each other and then withdrawing the connector.

In Figure 4 the design is such that when the bolt is in position the bottom of the kerf in the bolt is above the bottom of the nut. With this construction, when the connector is put in place the ends 13 of its arms merely spring into the adjacent threads of the nut and the parts are held against relative rotation to the extent that such rotation is prevented by the resilient engagement of the ends 13 with the threads of the nut.

In Figure 5 I show a different form of connector, which may be used in any of the relations shown in the other figures of the drawing. As shown in Figure 5, the connector is a flat plate 14 having the end thereof which is inserted into the kerf 10, bifurcated as indicated at 15—15, these bifurcations 15—15 diverging from each other. When this form of connector is put in position, if sufficient force is applied to the upper end, the bifurcations 15 will be spread still further apart and pass out from the sides of the kerf 10, when used with a bolt and nut proportioned as in Figure 2, or will be driven into effective holding engagement with the threads of the nut, when used with a nut and bolt proportioned as shown in Figures 4 and 5.

The construction described is effective for its purpose. In the first place the splitting of the bolt down through its head and part way down the shank, in itself causes the upper end of the bolt to engage resiliently the adjacent walls of the nut. And the connector may be made of proper size so that as it is inserted in the kerf 10 it will further expand the split end of the bolt. At any rate, when the connector is in place the bolt is substantially solid, with the addition of means for practically preventing or at least restraining, undesired relative rotation between bolt and nut. In the Figure 2 form the restraint is positive so long as the connector is in place. In Figure 4 the restraint is resilient, and in Figure 5 it depends on the jamming of metal against metal.

The bolt has an important usefulness even when no connector is employed. Assuming that a bolt, such as shown in the drawings, has been positioned in a threaded bolt-hole or socket, as in any of the figures of the drawing, it is evident that a tool may be inserted in the kerf 12, and the threads of the nut or socket adjacent the side openings of the kerf distorted, so as to hold the parts in non-rotative relation. In this aspect the invention consists of a bolt provided with a kerf opening from the top of the head and extending downwardly into the threaded shank part, and, of course, open on at least one side of the shank.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. In an assembly of the kind described, a headed externally threaded bolt provided with a straight-bottomed kerf opening from the top of the head and extending longitudinally down through the head and part way down into the shank, the bolt threads extending below the bottom of the kerf, an internally threaded nut which receives the threaded shank of the bolt, and a connector in the kerf resting upon the bottom thereof and having portions at its lower end extending laterally in opposite directions from the kerf and engaging the adjacent threaded wall of the nut.

2. The device set forth in claim 1 in which the connector is a U-shaped wire, having the ends of its arms bent outwardly.

In testimony whereof I affix my signature.

EDWIN B. STIMPSON.